March 17, 1970
JAMES E. WEBB
ADMINISTRATOR OF THE NATIONAL AERONAUTICS
AND SPACE ADMINISTRATION
3,501,684
DUAL POLARITY FULL WAVE DC MOTOR DRIVE
Filed Dec. 27, 1966
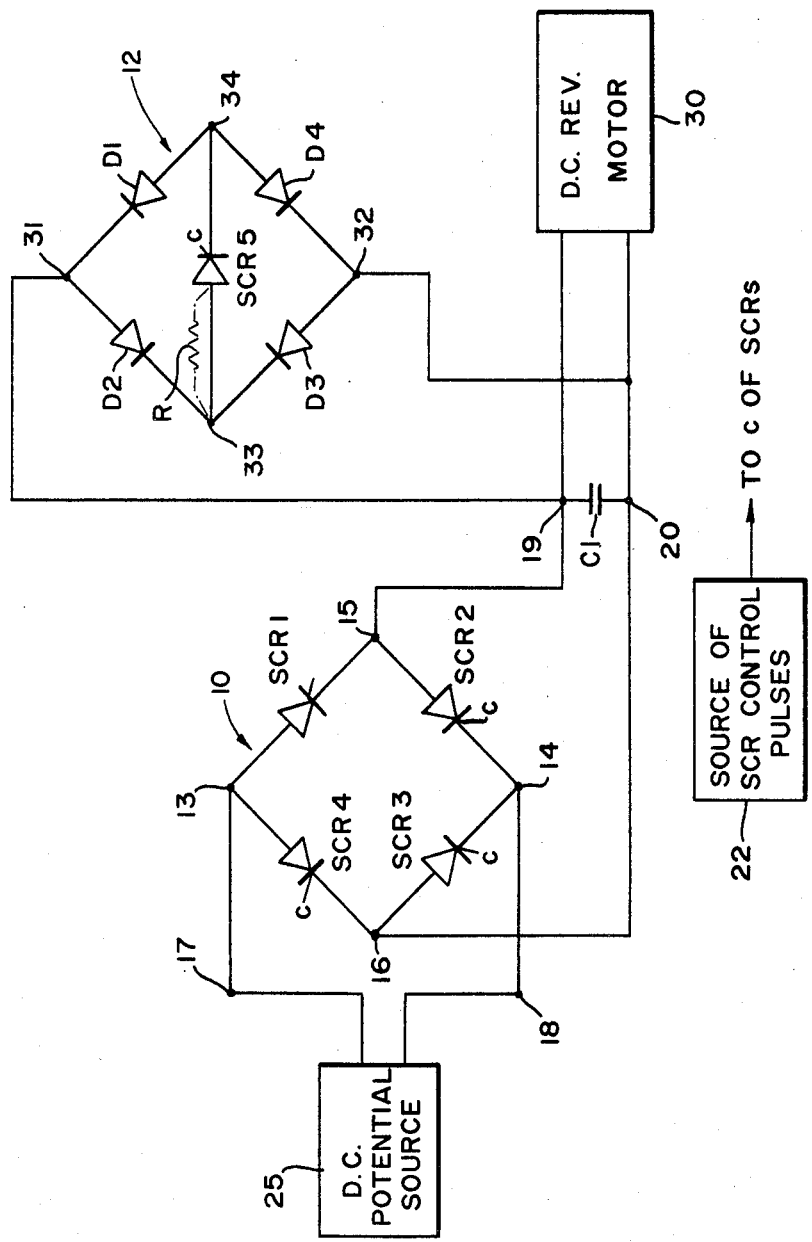
MICHAEL F. HANNA
*INVENTOR.*
BY
ATTORNEYS

United States Patent Office 3,501,684
Patented Mar. 17, 1970

3,501,684
DUAL POLARITY FULL WAVE
DC MOTOR DRIVE
James E. Webb, Administrator of the National Aeronautics and Space Administration, with respect to an invention of Michael F. Hanna, Glendora, Calif.
Filed Dec. 27, 1966, Ser. No. 605,098
Int. Cl. H02p 3/12
U.S. Cl. 318—258                                    4 Claims

ABSTRACT OF THE DISCLOSURE

A solid state braking circuit for use with a DC reversible motor of the type which is rotatable in either of two directions, as a function of the polarity of a DC potential across its input terminals, the motor being breakable by substantially shorting its input terminals, by the provision of a low resistance path therebetween. The braking circuit comprises four conventional diodes connected in a bridge arrangement, having four junction points. Two of the junction points are directly connected to the two input terminals of the motor, while a SCR diode is connected across the other two junction points. By providing an enabling control signal to the control input terminals of the SCR a low resistance path is provided across the SCR and between the input terminals of the motor. The low resistance path includes two of the four diodes in series with the SCR. The two diodes which are included in the low resistance path, depend on the polarity of the DC potential applied to the input terminals of the motor. Four SCR's connected in a different bridge arrangement for switching the polarity and controlling the amplitude of the potential applied to the input terminals from a potential source are also disclosed.

---

The invention described herein was made in the performance of work under a NASA contract and is subject to the provisions of Section 305 of the National Aeronautics and Space Act of 1958, Public Law 85–568 (72 Stat. 435; 42 USC 2457).

This invention generally relates to motor control circuitry and, more particularly, to a circuit for controlling a reversible direct current motor.

Various solid state devices have been developed to control the speed of direct current (DC) motors. Some employ silicon controlled rectifiers, gated by variable width pulses. By varying the pulse width, the power supplied to the motor "per cycle" is controlled, thereby controlling its speed. When controlling a DC motor, capable of rotating in either of two directions, it is necessary to be able to control the polarity of the DC potential or voltage across the motor's input terminals, so that by reversing the polarity, the motor's direction of rotation is reversed. Also in simple DC motors, to accurately position a load of substantial inertia, it is necessary to be able to accurately stop or brake the motor at a given position.

It is a primary object of the present invention to provide a new, simple circuit for controlling a DC reversible motor.

Another object is to provide a simple braking arrangement for a DC reversible type motor.

A further object is the provision of a simple, relatively inexpensive circuit for controlling the speed, direction of rotation and breaking of a DC reversible type motor.

Still a further aspect is to provide a simple motor control circuit by means of which a simple DC reversible motor may be controlled for accurate load positioning.

These and other objects of the invention are achieved by providing a solid state control circuit in which a plurality of silicon-controlled rectifiers (SCRs) are arranged to selectively control DC potential and the polarity thereof, supplied to a motor and thereby control its direction of rotation. An additional simple SCR is used, together with a plurality of diodes, to form a simple, yet highly effective braking circuit, which is connected across the motor's armature terminals. Irrespective of the polarity of the potential across the terminals, by actuating the single SCR in the braking circuit, the motor's armature terminals are shorted to accurately brake or stop the motor. Thus, a relatively simple DC reversible motor may be used to accurately position a load connected thereto.

The novel features that are considered characteristic of this invention are set forth with particularity in the appended claims. The invention itself both as to its organization and method of operation, as well as additional objects and advantages thereof, will best be understood from the following description when read in connection with the accompanying drawing.

Referring to the drawing, the control circuit of the present invention is shown including a first bridge-like circuit 10 and a braking circuit, generally designated by numeral 12. Circuit 10 includes four SCRs, designated SCR1 through SCR4 with the anodes of SCR1 and SCR4 connected at a junction point 13, while the cathodes of SCR2 and SCR3 are connected at a junction point 14. Points 13 and 14 are connected respectively, to terminals 17 and 18, which comprise the input terminals of the control circuit of the invention. The cathode and anode of SCR1 and SCR2 respectively, are connected at a junction point 15 which is tied to one output terminal 19 of the control circuit, while the cathode and anode of SCR4 and SCR3 respectively, are connected at point 16, which is tied to another otuput terminal 20. In addition to the anode and cathode, each SCR also includes a control electrode c. As is appreciated by those familiar with the art, when a control pulse is applied at terminal c the SCR is switched to an ON state so that the resistance for direct current between the anode and cathode thereof is very small. In the drawing, numeral 22 represents a source of SCR control pulses. In operation, input terminals 17 and 18 are connected to a source of DC potential, such as source 25 which is assumed to provide the power for driving the motor controlled by the circuit, such as a DC reversible motor 30, shown connected across the output terminals 19 and 20. Motor 30 may be of the shunt wound type. For explanatory purposes it is assumed that input terminal 17 is positive with respect to terminal 18.

The source 25 is preferably a pulsating DC source which may be formed by rectifying an alternating-current (AC) voltage signal, so that during each half cycle the voltage varies from zero to a maximum and back to zero. By applying control pulses to SCR1 and SCR3 during each half cycle of the AC signal, the two rectifiers SCR1 and SCR3 are switched to an ON state thereby providing a minimum impedance, thereacross, so that input terminals 17 and 18 may be thought of as being directly connected to terminals 19 and 20, respectively. Consequently, terminal 19 is positive with respect to terminal 20, causing the motor 30 to rotate in a first direction. On the other hand, when SCR2 and SCR4 are supplied with control pulses during each half cycle, input terminals 17 and 18 may be thought of as being connected to terminals 20 and 19, respectively. As a result, terminal 20 is positive with respect to terminal 19 so that motor 30 is caused to rotate in an opposite direction.

The speed rotation of motor 30 is conveniently controlled by controlling the time during each half cycle when the control pulses are applied, thereby controlling the portion of each half cycle during which power is supplied to the motor. It should thus be apparent that the four SCRs of circuit 10 provide a simple arrangement for controlling the direction and speed of rotation of motor 30. If only control of direction of rotation is required, source 25 may consist of a simple DC source, which is momentarily disconnected from the input terminals every time a change of direction of rotation is required.

As is appreciated by those familiar with the art, in DC motors, due to the inertia developed in the armature mass or in the load applied to the motor, such motors even after the removal of the power applied thereto tend to coast. Such coasting prevents their use for accurate load positioning, without proper motor braking arrangements, by means of which the motors are abruptly stopped when desired.

In accordance with the teachings of the invention, circuit 12 comprises a simple braking arrangement for motor 30. Circuit 12 is used, irrespective of the relative polarity of the potential across terminals 19 and 20 to which it is connected. Briefly, circuit 12 is controlled to provide a very low resistive path, which may be thought of as an electrical short between terminals 19 and 20 irrespective of which of the terminals is more positive than the other. By shorting the motor's terminals, which in a shunt wound motor represent the armature winding terminals, the motor can be quickly stopped so that a load rotated thereby can be accurately positioned.

As seen from the drawing, circuit 12 includes four diodes D1–D4, arranged in a full wave rectifying bridge-like arrangement, defining four junction points 31–34. Terminal 19 and the anode and cathode of diodes D1 and D2 respectively, are connected at point 31, while terminal 20 and the anode and cathode of diodes D3 and D4 respectively are connected at 32. The cathodes of D2 and D3 and an anode of an SCR5 are tied at point 33, while the cathode of SCR5 and anodes of D1 and D4 are connected at point 34. By switching SCR5 to an ON state, such as by applying a control pulse at the $c$ terminal thereof, an extremely low resistive path for direct current is provided between terminals 19 and 20. For example, when terminal 19 is positive with respect to terminal 20 the path is provided by forward biased diode D2, SCR5 in its ON state and forward biased diode D4. On the other hand when terminal 20 is positive with respect to terminal 19 the path is provided by forward biased D3, SCR5 and forward biased D1.

Since the total DC resistance of two forward biased diodes and an SCR in the ON state is very small it can be thought of as an electrical short. Thus, by enabling conduction in SCR5, circuit 12 may be thought of as capable of shorting the terminals 19 and 20, irrespective of the relative polarity of the potential difference thereacross, i.e. irrespective of which terminal is positive with respect to the other. By shorting the motor's terminals, the motor can be quickly and accurately stopped. Thus, circuit 12 is most useful in braking or stopping a DC reversible motor, with the braking circuit consisting entirely of four conventional diodes, arranged in a full wave rectifying bridge arrangement with a controllable SCR thereacross. A capacitor C may be connected across terminals 19 and 20 to prevent the back EMF of the motor from accidentally misfiring any of the SCRs. Where complete shorting of the input terminals 19 and 20 to produce sudden braking is impractical or may damage the motor under certain heavy loading conditions, a resistor R may be connected in series with the SCR5. In such a case the anode of SCR5 is connected to point 33 through resistor R, shown in the drawing by a dashed line. Thus, slower dynamic braking is provided where sudden braking is impractical.

From the foregoing it should thus be appreciated that SCR1 through SCR4, arranged in the form of a bridge arrangement, comprising circuit 10, provide a very simple, yet highly useful arrangement for controlling the speed and direction of rotation of motor 30. Similarly, circuit 12 which consists of a single SCR and four diodes, arranged in another full wave rectifying bridge arrangement is a very simple circuit, yet is most useful in accurately braking or stopping motor 30, by shorting the terminals thereof, irrespective of the relative polarity of the potential thereacross.

There has accordingly been shown and described herein a novel DC motor control circuit. It is appreciated that modifications and or equivalents may be introduced by those familiar with the art without departing from the spirit of the invention. Therefore, all such modification and or equivalents are deemed to fall within the scope of the invention without departing from the scope of the invention as claimed in the appended claims.

What is claimed is:

1. For use with a direct-current motor having a pair of input terminals and rotatable in either of two opposite directions as a function of the polarity of a direct-current potential across said input terminals, the motor being of the type which is brakable by substantially shorting the input terminals by providing a low resistance path therebetween, a braking circuit comprising:
   first, second, third and fourth diodes connected to form a full wave rectifying bridge arrangement defining four junction points;
   means connecting the input terminals of the motor to two opposite ones of said junction points whereby said motor and said bridge arrangement are connected in parallel across said input terminals; and
   control means connected between the other two of said four junction points, said control means being selectively operable to a conductive state to provide a low resistance path across the input terminals of the motor, the path comprising two of said four diodes and said control means to brake said motor, with said control means being at a nonconductive state when said motor is rotatable in either of said two opposite directions.

2. The motor braking circuit as recited in claim 1 wherein each of said diodes includes an anode and a cathode, means connecting the cathode of said first and anode of said second diodes to a first junction point, means connecting the anode of said third and cathode of said fourth diodes to a second junction point, the input terminals of said motor being connected to said first and second junction points, means connecting the cathodes of said second and third diodes to a third junction point and the anodes of said first and fourth diodes to a fourth junction point, and means connecting said control means across said third and fourth junction points, whereby the low resistance path comprises said second diode, said control means and said fourth diode connected in series, when the direct-current potential at said first junction point is positive with respect to the direct-current potential at said second junction point, and said low resistance path comprises said third diode, said control means and said first diode when the direct-current potential at said first junction point is negative with respect to the direct-current potential at said second junction point.

3. The motor braking circuit as recited in claim 2 wherein said control means is a silicon controlled rectifier having an anode connected to said third junction point a cathode connected to said fourth junction point, and a control terminal connected to a source of control signals, said silicon controlled rectifier being responsive to control signals from said source to become conductive whereby said silicon controlled rectifier provides a low resistance path between the anode and cathode thereof.

4. A circuit for braking a direct-current motor irrespective of the polarity of the D-C potential applied to first and second terminals of said motor, said circuit comprising:
   a diode bridge having a first pair of diodes with their anodes connected together, a second pair of diodes with their cathodes connected together, said respective diode pairs together with said motor being connected in parallel across the terminals of said motor; and a silicon controlled rectifier having an anode connected to the junction of said cathode connected pair of diodes, a cathode connected to the junction of said anode connected pair of diodes, and a gate electrode connected to an external source of control signals and being responsive to control signals from said source to brake said motor by becoming conductive to provide a low resistance path between said anode and cathode junctions thereby to short circuit the D-C potential to said motor with a low resistance path being provided by serially connected one diode of said second pair, said silicon controlled rectifier and one diode of said first pair of diodes, when said first terminal is at a positive D-C potential with respect to said second terminal, and a low resistance path is provided by serially connected the other diode of said first pair, said silicon controlled rectifier and the other diode of said second pair when said second terminal is at a positive D-C potential with respect to first terminal.

References Cited

UNITED STATES PATENTS

| | | | |
|---|---|---|---|
| 2,605,454 | 7/1952 | Grepe | 318—380 |
| 3,222,587 | 12/1165 | Lichowsky | 318—380 |
| 3,295,037 | 12/1966 | Bullene | 318—269 |
| 3,302,090 | 1/1967 | Rayfield | 318—258 |
| 3,268,148 | 11/1956 | Henderson | 318—211 |
| 3,365,642 | 1/1968 | Risberg | 318—376 |
| 3,376,486 | 4/1968 | Caputo | 318—302 |

OTHER REFERENCES

IBM Technical Disclosure Bulletin, vol. 6 No. 10, March 1964, pages 85 and 86.

ORIS L. RADER, Primary Examiner

K. L. CROSSON, Assistant Examiner

U.S. Cl. X.R.

318—269, 302, 379